(12) United States Patent
Shoji

(10) Patent No.: US 8,738,809 B2
(45) Date of Patent: May 27, 2014

(54) ELECTRONIC DEVICE, DISPLAY SYSTEM, TRANSMISSION METHOD AND DISPLAY METHOD

(75) Inventor: Takuro Shoji, Kanagawa (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 12/378,239

(22) Filed: Feb. 12, 2009

(65) Prior Publication Data

US 2009/0207308 A1    Aug. 20, 2009

(30) Foreign Application Priority Data

Feb. 15, 2008    (JP) ................ P2008-035116

(51) Int. Cl.
*G06F 3/00* (2006.01)
(52) U.S. Cl.
USPC ............................................................. 710/3
(58) Field of Classification Search
USPC ............................................................. 710/3
See application file for complete search history.

(56) References Cited

U.S. PATENT DOCUMENTS

| | | | |
|---|---|---|---|
| 7,129,991 B2 | 10/2006 | Ejima et al. | |
| 2004/0249989 A1* | 12/2004 | Maciesowicz | 710/1 |
| 2005/0120384 A1* | 6/2005 | Stone et al. | 725/132 |
| 2006/0269056 A1* | 11/2006 | Montag | 380/205 |
| 2006/0285012 A1 | 12/2006 | Ejima et al. | |
| 2009/0284656 A1* | 11/2009 | Suzuki et al. | 348/554 |

FOREIGN PATENT DOCUMENTS

| | | |
|---|---|---|
| JP | 9-154077 A | 6/1997 |
| JP | 2002-232377 A | 8/2002 |
| JP | 2007-150853 A | 6/2007 |
| JP | 2007-202115 A | 8/2007 |
| JP | 2008-035192 A | 2/2008 |
| JP | 2008035189 A | 2/2008 |
| JP | 2009-077045 A | 4/2009 |
| WO | 2007-074611 A1 | 7/2007 |
| WO | 2007-123001 A1 | 11/2007 |
| WO | 2007136038 A1 | 11/2007 |
| WO | 2008013132 A1 | 1/2008 |

OTHER PUBLICATIONS

European Search Report EP 09152659, dated Aug. 13, 2010.
Hitachi et al: "HDMI Specification Version 1.3a" Internet Citation Nov. 16, 2006, XP002476103.

* cited by examiner

*Primary Examiner* — Henry Tsai
*Assistant Examiner* — Juanito Borromeo
(74) *Attorney, Agent, or Firm* — Lerner, David, Littenberg, Krumholz & Mentlik, LLP

(57) ABSTRACT

An electronic device includes an HDMI output terminal connectable to one of a first HDMI input terminal and a second HDMI input terminal of an external device, the first and second HDMI input terminals having a first physical address and a second physical address assigned thereto, respectively, a detection means for detecting a connection of the HDMI output terminal to one of the first and second HDMI input terminals, a read means for reading the first physical address from the external device when the connection of the HDMI output terminal to the first HDMI input terminal is detected and reading the second physical address from the external device when the connection of the HDMI output terminal to the second HDMI input terminal is detected, and a transmission means for transmitting one of the read first and second physical addresses to the external device via the HDMI output terminal.

20 Claims, 14 Drawing Sheets

| Logical Address | Device Type |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

FIG.6

| Device | Input Terminal | Model |
|---|---|---|
| Player 1 | HDMI1 | ABC-XXX |
| Recorder 1 | HDMI2 | XYZ-123 |

ELECTRONIC DEVICE, DISPLAY SYSTEM, TRANSMISSION METHOD AND DISPLAY METHOD

CROSS REFERENCES TO RELATED APPLICATIONS

The present application claims priority from Japanese Patent Application No. JP 2008-035116, filed in the Japanese Patent Office on Feb. 15, 2008, the entire content of which is incorporated herein by reference.

BACKGROUND OF THE INVENTION

1. Field of the Invention

The present invention relates to an electronic device, a display system, a transmission method, and a display method capable of exchanging information with another device via HDMI (High-Definition Multimedia Interface).

2. Description of the Related Art

In related art, in communication between electronic devices via HDMI, an HDMI sink device (hereinafter referred to simply as "sink device") has been able to display a connection mode of an HDMI source device (hereinafter referred to simply as "source device") connected to the sink device in a menu form on a display of the sink device.

For example, when the sink device includes two HDMI input terminals, that is, HDMI 1 and HDMI 2, a list of device name information and device type information on source devices connected respectively to the HDMI 1 and the HDMI 2 is displayed.

Each of the source devices obtains a physical address assigned to the HDMI input terminal of the sink device to which the source device is connected by reading EDID (Extended Display Identification Data) and notifies the sink device of the obtained physical address as its own physical address, with the result that the above list can be displayed, the EDID corresponding to each of the HDMI input terminals and held by the sink device.

A transmission system capable of communication via HDMI is disclosed in Japanese Patent Application Laid-open No. 2002-232377.

SUMMARY OF THE INVENTION

However, in the HDMI transmission system of the related art as described above, when a connection destination of the source device is changed from a certain HDMI input terminal of a sink device to another HDMI input terminal thereof, the source device is not designed to reread (re-obtain) the physical address. Therefore, in the change of the connection destination described above, the updated latest connection mode of the source device (that is, the device type of the source device and the name of the HDMI input terminal to which the source device is connected) is not reflected in the menu display. Hence, it is difficult for a user to know the latest connection mode, which causes misunderstanding and confusion to the user.

In view of the above circumstances, it is desirable to provide an electronic device, a display system, a transmission method, and a display method capable of reporting the latest connection mode between devices that support HDMI to the user in real time.

According to an embodiment of the present invention, there is provided an electronic device including an HDMI output terminal, a detection means, a read means, and a transmission means. The HDMI output terminal is connectable to one of a first HDMI input terminal and a second HDMI input terminal of an external device, the first HDMI input terminal having a first physical address assigned thereto, the second HDMI input terminal having a second physical address assigned thereto. The detection means detects a connection of the HDMI output terminal to one of the first and second HDMI input terminals. The read means reads the first physical address from the external device when the connection of the HDMI output terminal to the first HDMI input terminal is detected and reads the second physical address from the external device when the connection of the HDMI output terminal to the second HDMI input terminal is detected. The transmission means transmits one of the read first and second physical addresses to the external device via the HDMI output terminal.

Here, the electronic device functions as an HDMI source device and the external device as an HDMI sink device, but each of the electronic device and the external device may have both functions of the sink device and the source device (repeater device) instead of having only one function. The first and second HDMI input terminals are capable of input of signals of video data, audio data, and the like but also, for example, output of a control signal and the like. Similarly, the HDMI output terminal is capable of not only output but also input of signals. Examples of the electronic device include a reproducing apparatus such as a BD (Blu-ray Disc) player or a DVD player, a recording/reproducing apparatus (PVR; Personal Video Recorder) including a recording medium such as an HDD (Hard Disk Drive), a set top box, a digital video camera, and an AV amplifier. Examples of the external device include a television apparatus (hereinafter referred to as "TV") and a projector. The detection means detects the connection, for example, based on an HPD (Hot Plug Detect) signal. The first and second HDMI input terminals and the HDMI output terminal may be connected by a fixed line (HDMI cable) or by radio.

According to this configuration, every time the connection to the first or second HDMI input terminal is detected by the detection means, the electronic device can read the first or second physical address assigned to each HDMI input terminal (that is, the electronic device) from the external device and transmit the read physical address to the external device. Therefore, every time the electronic device is connected to the first or second HDMI input terminal, the external device can receive a report of the connection. Accordingly, every time the electronic device is connected, the external device can report the mode of connection to each of the HDMI input terminals to the user in real time, for example, by displaying it. Further, for example, even when the connection destination of the electronic device is changed from the first HDMI input terminal to the second HDMI input terminal, the external device can update the connection destination and report the change of the connection destination to the user in real time.

The electronic device may further include a storage means for storing the read first physical address when the connection to the first HDMI input terminal is detected and an update means for updating the stored first physical address to the read second physical address when the connection to the second HDMI input terminal is detected.

Accordingly, when the electronic device is temporarily connected to the first HDMI input terminal of the external device and then the connection destination is changed to the second HDMI input terminal, the change of the connection destination can be reported to the external device in real time by obtaining again a physical address with the detection of the connection to the second HDMI input terminal as a trigger.

In the electronic device, the transmission means may transmit device type information indicating a device type of the electronic device with the first or second physical address to the external device.

Here, the device type information refers to information such as "Playback Device", "DVD system", "Recording Device", "STB", or "Audio System". Accordingly, when the connection destination of the electronic device is changed between the first HDMI input terminal and the second HDMI input terminal, it is possible to report the device type of the electronic device whose connection destination is changed, together with the change of the connection destination, to the external device in real time.

In the electronic device, the transmission means may further transmit model name information indicating a model name of the electronic device.

Here, the model name refers to an identifier constituted of numbers and alphabetic characters and assigned to each electronic device. With this configuration, even when electronic devices of the same device type are connected to the first HDMI input terminal and the second HDMI input terminal of the external device, the external device causes the user to distinguish between the electronic devices connected to the respective HDMI input terminals by displaying the model name information. The display of the model name information also causes the user to distinguish between the mere change of the connection destination of the electronic device between the first HDMI input terminal and the second HDMI input terminal and the connection of a new electronic device.

An electronic device according to another embodiment of the present invention includes a first HDMI input terminal, a second HDMI input terminal, a first storage means, a reception means, and a display means. The first HDMI input terminal is connectable to an HDMI output terminal of an external device. The second HDMI input terminal is connectable to the HDMI output terminal. The first storage means stores a first physical address assigned to the first HDMI input terminal and a second physical address assigned to the second HDMI input terminal. The reception means receives the first physical address and device type information indicating a device type of the external device from the external device when the HDMI output terminal is connected to the first HDMI input terminal, and receiving the second physical address and the device type information from the external device when the HDMI output terminal is connected to the second HDMI input terminal. The display means displays input terminal identification information identifying the HDMI input terminal to which the external device is connected and the device type information on the external device based on at least one of the received first and second physical addresses and the device type information.

Here, the electronic device refers to an HDMI sink device such as a TV, a display apparatus, or a projector, and the external device refers to an HDMI source device (or repeater device) such as a reproducing apparatus or an AV amplifier.

According to this configuration, every time the external device is connected to the first or second HDMI input terminal, a report of the connection can be received. Accordingly, the electronic device can report the mode of connection to each of the HDMI input terminals to the user in real time by displaying it every time the external device is connected. Further, for example, even when the connection destination of the external device is changed from the first HDMI input terminal to the second HDMI input terminal, the electronic device can know the change of the connection destination and report it to the user in real time.

In the electronic device, the display means may update and display, based on the received second physical address when the HDMI output terminal is connected to the second HDMI input terminal, the input terminal identification information that has been displayed based on the received first physical address in a case where the HDMI output terminal has been connected to the first HDMI input terminal.

Accordingly, when the connection destination of the external device is changed from the first HDMI input terminal to the second HDMI input terminal, by receiving the second physical address and updating and displaying the input terminal identification information, the change of the connection destination can be reported to the user by updating the display in real time.

The electronic device may further include a second storage means for storing priority information indicating priorities of a plurality of different pieces of the device type information. A plurality of different device types may be assigned to the external device. The reception means may receive the plurality of pieces of device type information respectively. The display means may display for each external device one kind of device type information selected from among the received plurality of pieces of device type information based on the stored priority information.

Examples of the case where a plurality of different device types are assigned to the external device include a case where two kinds of device type information, that is, "Playback Device" and "Audio System" are assigned to a DVD/AV system in which a DVD player and an AV amplifier are integrated. With this configuration, even when a plurality of different pieces of device type information are assigned to one external device, one kind of device type information selected in accordance with the priorities can be displayed. This can prevent the user from being likely to believe that two external devices are connected to one HDMI input terminal by displaying a plurality of pieces of device type information separately with respect to one external device.

In the electronic device, the reception means may further receive model name information indicating a model name of the external device, and the display means may display the received model name information with the device type information and input terminal identification information.

Accordingly, by displaying the model name information, even when external devices of the same device type are connected to the HDMI input terminals, respectively, the user can distinguish between the respective external devices. Further, the display of the model name information causes the user to distinguish between the mere change of the connection destination of the external device between the first HDMI input terminal and the second HDMI input terminal and the connection of a new external device.

In the electronic device, a plurality of different device types may be assigned to the external device, the reception means may receive the plurality of pieces of device type information respectively, and the display means may display the received plurality of pieces of device type information with each one of the device type information and input terminal identification information.

Accordingly, even when the external device has a plurality of functions, the user can know all the functions.

A display system according to still another embodiment of the present invention includes a source device having an HDMI output terminal and a sink device having a first HDMI input terminal and a second HDMI input terminal. The source device includes a first storage means for storing device type information indicating a device type of the source device, a detection means for detecting a connection of the HDMI output terminal to one of the first and second HDMI input terminals, a read means for reading a first physical address assigned to the first HDMI input terminal from the sink device when the connection of the HDMI output terminal to the first HDMI input terminal is detected and reading a second physical address assigned to the second HDMI input terminal from the sink device when the connection of the HDMI output terminal to the second HDMI input terminal is detected, and a transmission means for transmitting one of the read first and second physical addresses and the device type information to the sink device via the HDMI output terminal. The sink device includes a second storage means for storing the first and second physical addresses, a reception means for receiving the transmitted first physical address and device type information via the first HDMI input terminal and receiving the transmitted second physical address and device type information via the second HDMI input terminal, and a display means for displaying input terminal identification information identifying the HDMI input terminal to which the source device is connected and the device type information on the source device based on at least one of the received first and second physical addresses and the device type information.

A transmission method according to another embodiment of the present invention includes detecting that an HDMI output terminal is connected to one of a first HDMI input terminal and a second HDMI input terminal of an external device, the first HDMI input terminal having a first physical address assigned thereto, the second HDMI input terminal having a second physical address assigned thereto, reading the first physical address from the external device when the connection of the HDMI output terminal to the first HDMI input terminal is detected and reading the second physical address from the external device when the connection of the HDMI output terminal to the second HDMI input terminal is detected, and transmitting one of the read first and second physical addresses to the external device via the HDMI output terminal.

A display method according to still another embodiment of the present invention includes storing a first physical address assigned to a first HDMI input terminal connectable to an HDMI output terminal of an external device and a second physical address assigned to a second HDMI input terminal connectable to the HDMI output terminal, receiving the first physical address and device type information indicating a device type of the external device from the external device when the HDMI output terminal is connected to the first HDMI input terminal, and receiving the second physical address and the device type information from the external device when the HDMI output terminal is connected to the second HDMI input terminal, and displaying input terminal identification information identifying the HDMI input terminal to which the external device is connected and the device type information on the external device based on at least one of the received first and second physical addresses and the device type information.

As described above, according to the embodiments of the present invention, the latest connection mode between devices that support HDMI can be reported to the user in real time.

These and other objects, features and advantages of the present invention will become more apparent in light of the following detailed description of best mode embodiments thereof, as illustrated in the accompanying drawings.

BRIEF DESCRIPTION OF DRAWINGS

FIG. 6 is a table showing definitions of logical addresses and device types in a CEC protocol;

DESCRIPTION OF PREFERRED EMBODIMENTS

An embodiment of the present invention will be described below with reference to the drawings.

Figure 1:
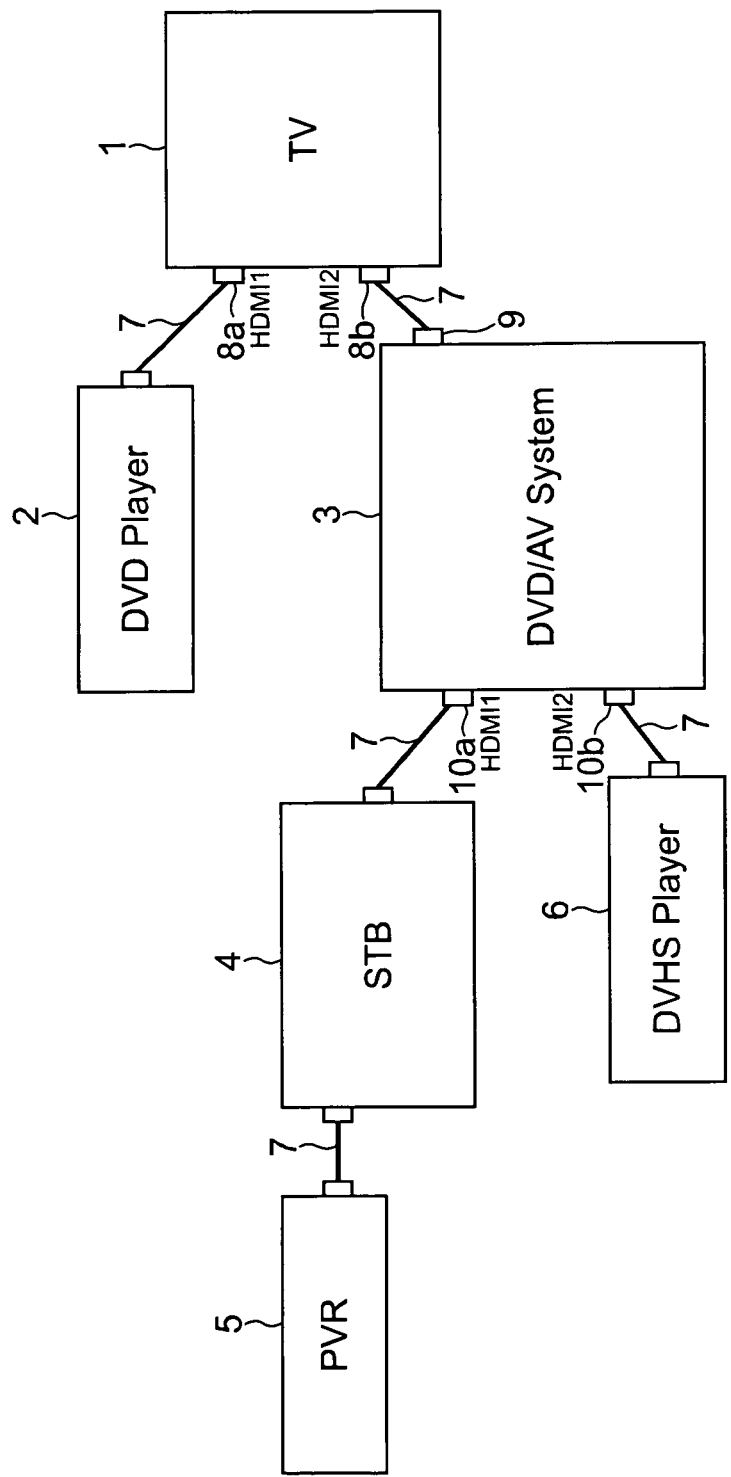
FIG. 1 is block diagram showing a configuration of a transmission system in an embodiment of the present invention.

FIG. 1 is a block diagram showing a configuration of a transmission system according to an embodiment of the present invention.

As shown in this figure, the transmission system includes electronic devices such as a television apparatus 1 (hereinafter referred to as "TV 1"), a DVD player 2, a DVD/AV system 3, an STB 4, a PVR 5, a digital VHS player 6 (hereinafter referred to as "DVHS player 6").

The TV 1 has two HDMI input terminals 8a and 8b (HDMI 1 and HDMI 2). The DVD/AVD system 3 has one HDMI output terminal 9 and two HDMI input terminals 10a and 10b (HDMI 1 and HDMI 2). The DVD player 2, the PVR 5, and the DVHS player 6 each have one HDMI output terminal, and the STB 4 has one HDMI input terminal and one HDMI output terminal. These HDMI input/output terminals are all connectable with HDMI cables 7.

In this figure, between the TV 1 and the DVD player 2 and between the TV 1 and the DVD/AV system 3, the DV 1 functions as a sink device, and the DVD player 2 and the DVD/AV system 3 function as source devices. Among the TV 1, the DVD/AV system 3, the STB 4, and the PVR 5, the TV 1 functions as a sink device, the DVD/AV system 3 and the STB 4 function as repeater devices, and the PVR 5 functions as a source device. Among the TV 1, the DVD/AV system 3, and the DVHS player 6, the TV 1 functions as a sink device, the DVD/AV system 3 functions as a repeater device, and the DVHS player 6 functions as a source device.

In this embodiment, configurations and operations of the TV 1 and the DVD/AV system 3 out of these devices will be mainly described.

Figure 2:
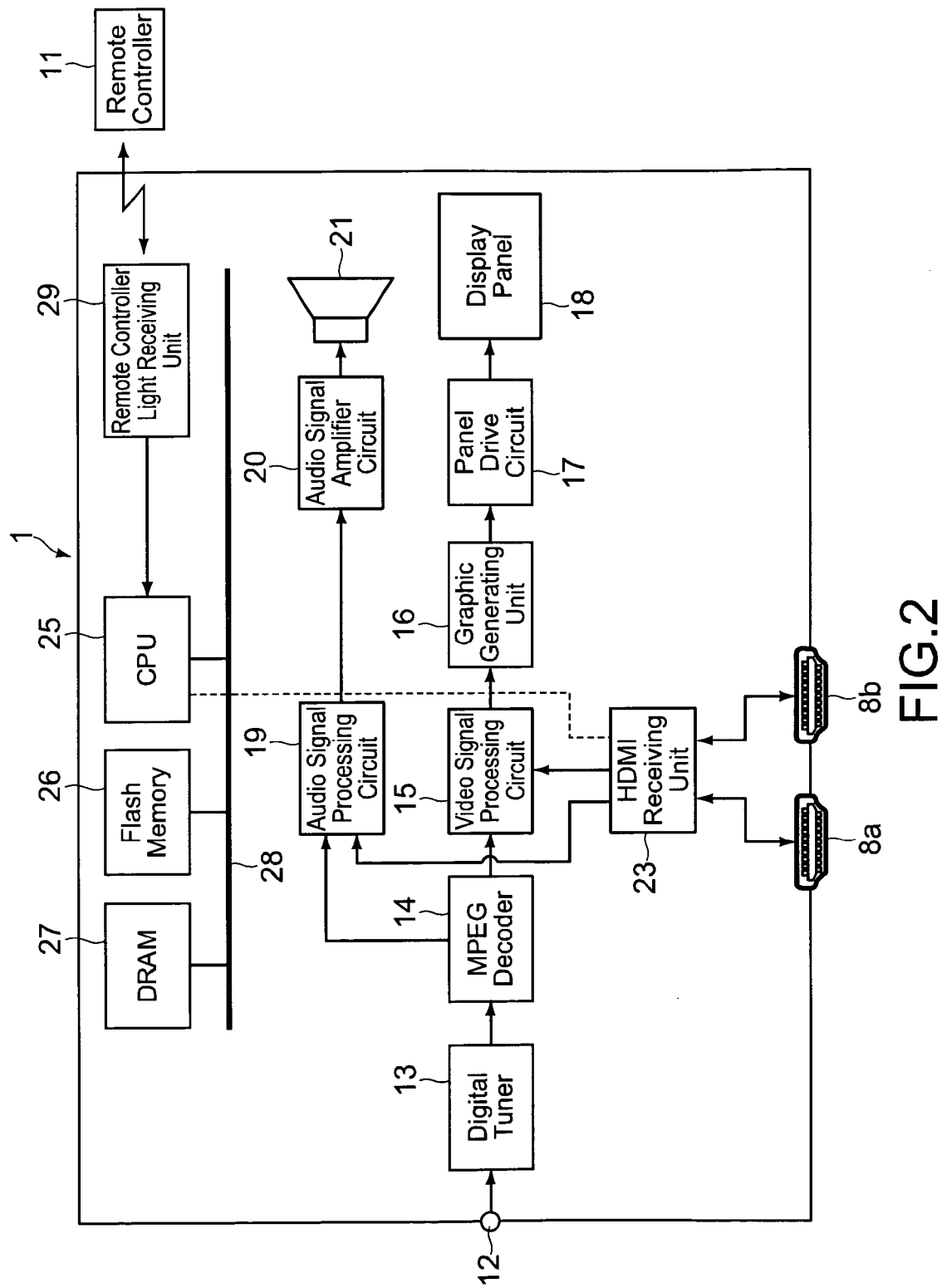
FIG. 2 is a block diagram showing a configuration of a TV in the embodiment of the present invention.

FIG. 2 is a block diagram showing a configuration of the TV 1.

As shown in this figure, the TV 1 includes a digital antenna input terminal 12, a digital tuner 13, an MPEG decoder 14, a video signal processing circuit 15, a graphic generating unit 16, a panel drive circuit 17, a display panel 18, an audio signal processing circuit 19, an audio signal amplifier circuit 20, a speaker 21, the HDMI input terminals 8a and 8b, an HDMI receiving unit 23, a CPU (Central Processing Unit) 25, a flash memory 26, a DRAM (Dynamic Random Access Memory) 27, an internal bus 28, and a remote controller light receiving unit 29.

A broadcast signal of digital broadcasting received by a digital antenna (not shown) is inputted to the digital antenna input terminal 12. The digital tuner 13 selects a signal of a designated channel from the broadcast signal and frequency-converts the signal into a baseband signal and outputs the baseband signal to the MPEG decoder 14. The MPEG decoder 14 decodes the encoded AV baseband signal and outputs a video signal of the decoded signal to the video signal processing circuit 15 and an audio signal thereof to the audio signal processing circuit 19.

The video signal processing circuit 15 performs necessary video processing on the inputted video signal and outputs the signal to the graphic generating unit 16. The graphic generating unit 16 synthesizes the inputted video signal, a GUI (Graphical User Interface) screen, and the like by OSD (On Screen Display) processing and outputs the synthesized one to the panel drive circuit 17. The panel drive circuit 17 performs D/A conversion and the like of the video signal supplied from the graphic generating unit 16 and drives the display panel 18 according to the video signal converted to an analog video signal. The display panel 18 is, for example, an LCD (Liquid Crystal Display), a PDP (Plasma Display Panel), or the like and displays the analog video signal inputted from the panel drive circuit 17. On the display panel 18, not only a reproduction screen for video contents but also, for example, a menu screen (hereinafter referred to as "connected device menu screen") showing a list of devices connected to the TV 1 via HDMI and various setting screens are displayed by, for example, OSD.

The audio signal processing circuit 19 performs necessary audio processing on the inputted audio signal and outputs the audio signal to the audio signal amplifier circuit 20. The audio signal amplifier circuit 20 adjusts the inputted audio signal to a necessary sound volume, and outputs the adjusted audio signal to the speaker 21 to reproduce it.

As described above, the HDMI input terminals 8a and 8b are each connectable to a different source device (or repeater device) such as the DVD player 2 and the DVD/AV system 3 via the HDMI cable 7 and each receive input of a video signal and an audio signal included in various contents as a digital baseband signal from the different source device (or repeater device). Further, a control signal for a CEC (Consumer Electronics Control) message described later or the like is inputted/outputted between each of the HDMI input terminals 8a and 8b and the different source device (or repeater device).

The HDMI receiving unit 23 receives the video signal and audio signal inputted from each of the HDMI input terminals 8a and 8b and outputs the video signal to the video signal processing circuit 15 and the audio signal to the audio signal processing circuit 19, respectively. The HDMI receiving unit 23 controls the transmission/reception of the control signal between the CPU 25 and each of the HDMI input terminals 8a and 8b.

The CPU 25 accesses the DRAM 27 and the like as necessary and collectively controls blocks of the TV 1. The flash memory 26 is a nonvolatile memory in which firmware including an OS, programs, and various parameters to be executed by the CPU 25 is fixedly stored. The DRAM 27 is a memory which is used as a work area of the CPU 25 and the like and in which the OS, programs, processing data, and the like are temporarily stored. The CPU 25, the flash memory 26, and the DRAM 27 are connected to the internal bus 28 and mutually accessed, so that the entire TV 1 can be controlled. The CPU 25 is also connected to the HDMI receiving unit 23 and controls data reception processing of the HDMI receiving unit 23.

The remote controller light receiving unit 29 receives a remote control signal from a remote controller 11 operated by a user and outputs the remote control signal to the CPU 25. Thus, the control processing of the TV 1 based on the control signal, including the reception, reproduction, and the like of the content, is executed.

The remote controller 11 includes various operation portions such as numeric keys corresponding to broadcast channels, a menu button, and a reproduction button.

Figure 3:
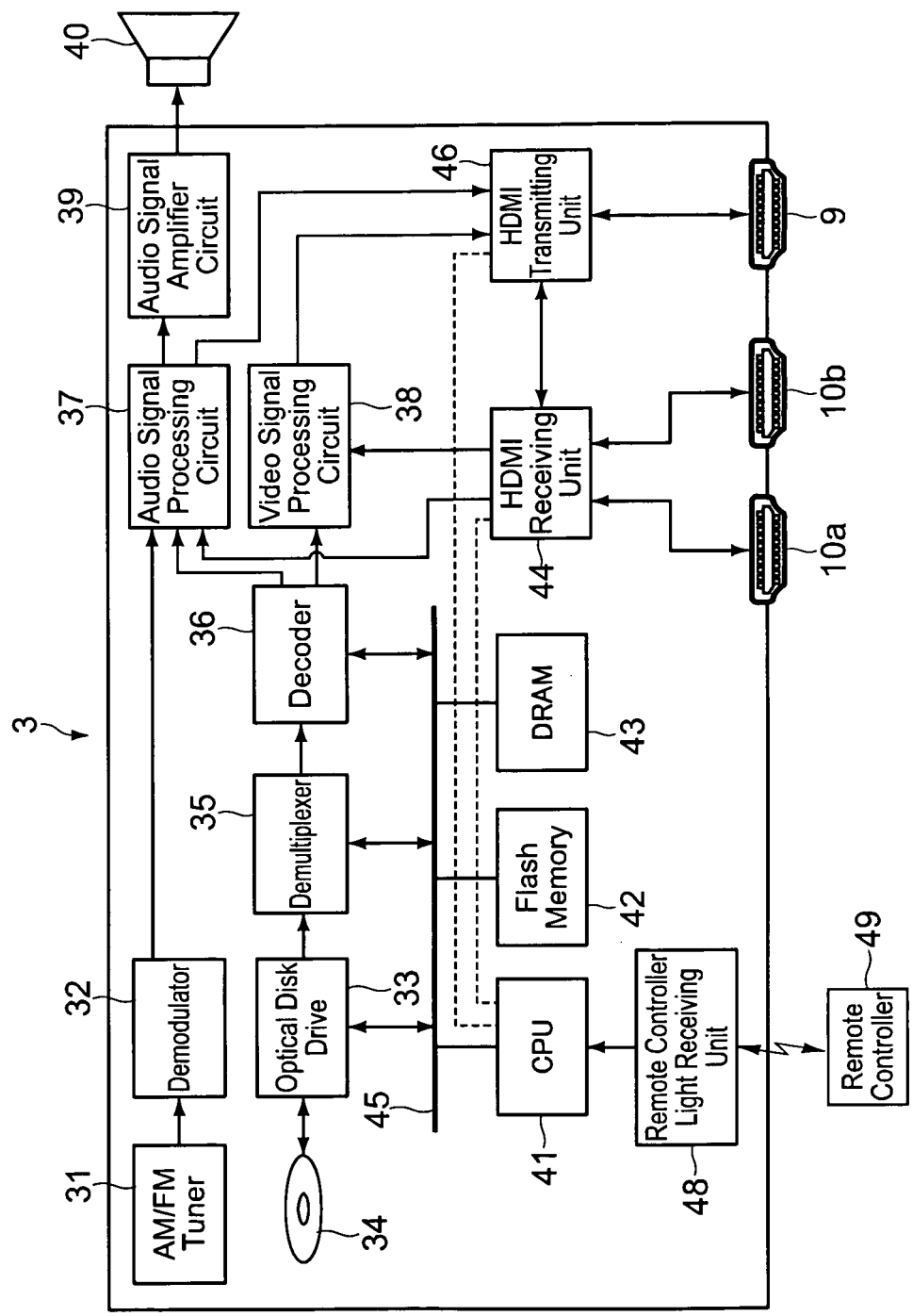
FIG. 3 is a block diagram showing a configuration of a DVD/AV system in the embodiment of the present invention.

FIG. 3 is a block diagram showing a configuration of the DVD/AV system 3.

The DVD/AV system 3 is a device that doubles as a DVD player and an AV amplifier.

As shown in this figure, the DVD/AV system 3 includes an AM/FM tuner 31, a demodulator 32, an optical disk drive 33, a demultiplexer 35, a decoder 36, an audio signal processing circuit 37, a video signal processing circuit 38, an audio signal amplifier circuit 39, a CPU 41, a flash memory 42, a DRAM 43, an HDMI receiving unit 44, an HDMI transmitting unit 46, HDMI input terminals 10a and 10b, an HDMI output terminal 9, and a remote controller light receiving unit 48.

A broadcast signal of AM/FM radio broadcasting received by an AM/FM antenna (not shown) is inputted to the AM/FM tuner 31. The AM/FM Tuner 31 selects a signal of a designated channel from the broadcast signal and outputs the selected signal to the demodulator 32. The demodulator 32 demodulates the signal inputted from the AM/FM tuner 31 to extract an audio signal, and outputs the audio signal to the audio signal processing circuit 37.

The optical disk device 33 reads a video content recorded on an optical disk 34 and outputs the video content to the demultiplexer 35. The video content recorded on the optical disk 34 is, for example, an MPEG stream compressed by an MPEG (Motion Picture Expert Group) method. The optical disk 34 is, for example, a DVD (DVD-Video, DVD-RAM, DVD-R, DVD-RW, DVD+R, DVD+RW, or the like), a BD (Blu-ray Disc), or the like. It should be noted that the compression method of moving image data is not limited to MPEG, and other compression methods are also possible.

The demultiplexer 35 demultiplexes the MPEG stream formed by multiplexing an audio stream and a video stream into the audio stream and the video stream and outputs the audio and video streams to the decoder 36.

The decoder 36 decodes the audio and video streams after the demultiplexing, converts the decoded audio and video streams into a digital audio signal and a digital video signal, respectively, and outputs the digital audio signal to the audio signal processing circuit 37 and the digital video signal to the video signal processing circuit 38.

The audio signal processing circuit 37 performs necessary audio processing on the inputted digital audio signal and outputs the digital audio signal to the audio signal amplifier circuit 39 or the HDMI transmitting unit 46.

The audio signal amplifier circuit 39 converts the inputted digital audio signal into an analog audio signal, adjusts the analog audio signal to a necessary sound volume, and outputs the adjusted signal to the speaker 40 to reproduce it. The speaker 40 is, for example, externally connected to the DVD/AV system 3, but may be built in the DVD/AV system 3.

The video signal processing circuit 38 performs necessary video processing such as OSD (On Screen Display) processing on the inputted digital video signal and outputs the digital signal as it is to the HDMI transmitting unit 46.

The CPU 41 accesses the DRAM 43 and the like as necessary and collectively controls blocks of the DVD/AV system 3. The flash memory 42 is a nonvolatile memory in which firmware including an OS, programs, and various parameters to be executed by the CPU 41 is fixedly stored. The DRAM 43 is a memory which is used as a work area of the CPU 41 and the like and in which the OS, programs, processing data, and the like are temporarily stored. The CPU 41, the flash memory 42, and the DRAM 43 are connected to the internal bus 45 and mutually accessed, so that the entire DVD/AV system 3 can be controlled. The CPU 41 is also connected to the HDMI receiving unit 23 and the HDMI transmitting unit 46 and controls data transmission/reception processing of both the units.

As described above, the HDMI input terminals 10$a$ and 10$b$ are each connectable to a different source device (or repeater device) such as the STB 4 or the DVHS player 6 via the HDMI cable 7 and each receive input of a video signal and an audio signal included in various contents as a digital baseband signal from the different source device (or repeater device). The control signal is inputted/outputted between each of the HDMI input terminals 10$a$ and 10$b$ and the different source device (or repeater device).

The HDMI receiving unit 44 receives the video signal and audio signal inputted from each of the HDMI input terminals 10$a$ and 10$b$ and outputs the video signal to the video signal processing circuit 38 and the audio signal to the audio signal processing circuit 37. The HDMI receiving unit 44 controls the transmission/reception of the control signal to/from the different source device (or repeater device) by each of the HDMI input terminals 10$a$ and 10$b$ under the control of the CPU 41.

As described above, the HDMI output terminal 9 is connectable to the sink device such as the TV 1 via the HDMI cable 7 and outputs the video signal and audio signal supplied from the HDMI transmitting unit 46 as the digital baseband signal to the sink device. The control signal is inputted/outputted between the HDMI output terminal 9 and the sink device.

The HDMI transmitting unit 46 outputs the video signal supplied from the video signal processing circuit 38 or the HDMI receiving unit 44 and the audio signal supplied from the audio signal processing circuit 37 or HDMI receiving unit 44 to the HDMI output terminal 9 and controls the transmission of the signal by the HDMI output terminal 9. The HDMI transmitting unit 46 controls the transmission/reception of the control signal between the HDMI output terminal 9 and the sink device under the control of the CPU 41.

Figure 4:
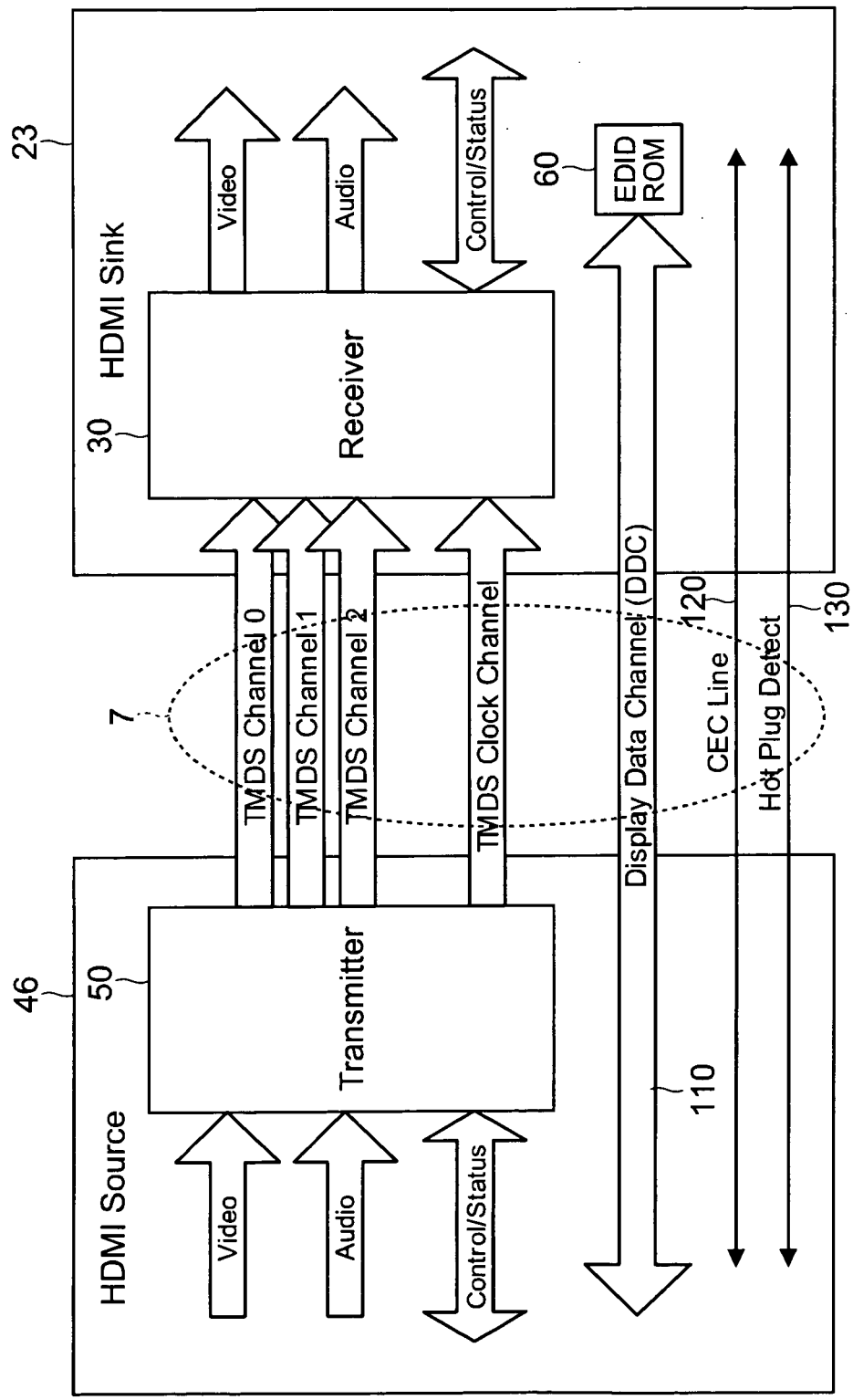
FIG. 4 is a diagram showing electrical configurations of an HDMI transmitting unit of the DVD/AV system and an HDMI receiving unit of the TV in the embodiment of the present invention.

FIG. 4 is a diagram showing electrical configurations of the HDMI transmitting unit 46 of the DVD/AV system 3 and the HDMI receiving unit 23 of the TV 1.

As described above, the HDMI transmitting unit 46 of the DVD/AV system 3 that serves as an HDMI source and the HDMI receiving unit 23 of the TV 1 that serves as an HDMI sink are connected by one HDMI cable 7. However, the HDMI transmitting unit 46 and the HDMI receiving unit 23 may be wirelessly connected.

The HDMI transmitting unit 46 includes a transmitter 50. The transmitter 50 converts, for example, uncompressed data on an image constituting video into a differential signal corresponding thereto and serially transmits the differential signal to the HDMI receiving unit 23 in one direction via three TMDS channels #0, #1, and #2.

Further, the transmitter 50 converts audio data accompanying the uncompressed video, auxiliary data including necessary control data, and the like into differential signals corresponding thereto and transmits the differential signals to the HDMI receiving unit 23 in one direction via the three TMDS channels #0, #1, and #2.

Furthermore, the transmitter 50 transmits a pixel clock synchronized with the image data transmitted via the three TMDS channels #0, #1, and #2 to the HDMI receiving unit 23 via a TMDS clock channel. Here, in one TMDS channel #i (i=0, 1, 2), 10-bit image data is transmitted during one clock of the pixel clock.

The HDMI receiving unit 23 includes a receiver 30. The receiver 30 receives the differential signal corresponding to the image data and the differential signals corresponding to the audio data and the control data which are transmitted in one direction from the HDMI transmitting unit 46 via the TMDS channels #0, #1, and #2 in synchronization with the pixel clock transmitted from the HDMI transmitting unit 46 via the TMDS clock channel.

Transmission channels between the HDMI transmitting unit 46 and the HDMI receiving unit 23 include three transmission channels, that is, a DDC line 110, a CEC line 120, and an HPD line 130 in addition to the above TMDS channels #0 to #02 and TMDS clock channel.

The DDC line 110 is constituted of two signal lines (not shown) included in the HDMI cable 7, and used for the HDMI transmitting unit 46 to read the above EDID from the HDMI receiving unit 23.

More specifically, the HDMI receiving unit 23 includes an EDIDROM (EDID ROM (Read Only Memory)) 60 in which the EDID that is information on setting and performance of the HDMI receiving unit 23 itself is stored in addition to the receiver 30. The HDMI transmitting unit 46 reads, from the HDMI receiving unit 23, the EDID stored in the EDIDROM 60 thereof via the DDC line 110, and based on the EDID, recognizes the setting and performance of the HDMI receiving unit 23, that is, for example, the format (profile) of the image supported by (the TV 1 including) the HDMI receiving unit 23, for example, RGB (Red/Green/Blue), YCbCr4:4:4, YCbCr4:2:2, or the like.

A physical address assigned to the HDMI transmitting unit 46 is also described in the EDID. The HDMI transmitting unit 46 obtains its own physical address by reading the EDID via the DDC line 110.

The CEC line 120 is constituted of one signal line (not shown) included in the HDMI cable 7, and used for two-way communication of data and messages (CEC messages) for control between the HDMI transmitting unit 46 and the HDMI receiving unit 23.

Since the TV 1 supports this CEC connection, it can present types and connection modes of devices in the HDMI connection from the topological point of view by using the connected device menu screen.

As described above, the HPD line 130 is used for each of the HDMI transmitting unit 46 and the HDMI receiving unit 23 to detect that it has been connected to the other electronic device, that is, the HDMI receiving unit 23 or the HDMI receiving unit 46 and judge whether or not one-way transmission and message response are allowed.

Next, operations of respective devices performed when the TV 1 displays the connected device menu screen in the transmission system thus configured will be described.

The TV 1 serving as the sink device can know device information on a connection destination device by using CEC messages such as <Polling Message>, <Report Physical Address>, and <OSD Name Transfer>, and by knowing the device information, the TV 1 can display the connected device menu screen.

First, the operations of respective devices performed when physical addresses are assigned to the respective devices in the transmission system will be described.

Figure 5:
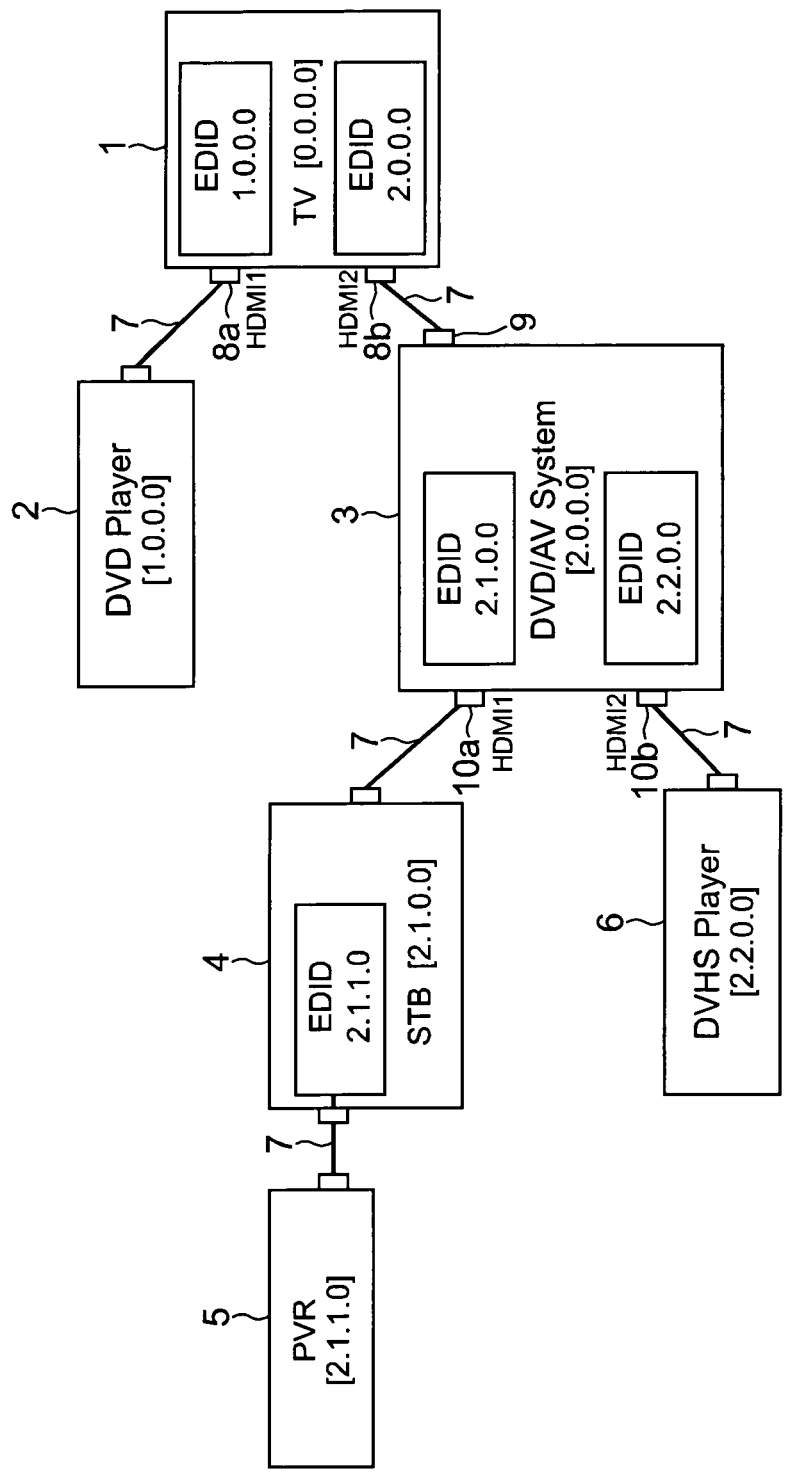
FIG. 5 is a diagram showing a state where physical addresses are assigned to respective devices in the transmission system in the embodiment of the present invention.

FIG. 5 is a diagram showing a state where the physical addresses are assigned to the respective devices.

As shown in this figure, each of the above TV 1, DVD/AV system 3, and STB 4 capable of functioning as the sink device or the repeater device has an EDID as described above and previously stores a unique physical address to be assigned to a device connected to each device itself.

In this figure, for example, the TV 1 assigns a physical address [1.0.0.0] to the HDMI input terminal 8a and a physical address [2.0.0.0] to the HDMI input terminal 8b. Similarly, the DVD/AV system 3 assigns a physical address [2.1.0.0] to the HDMI input terminal 10a and a physical address [2.2.0.0] to the HDMI input terminal 10b.

When the source device (or repeater device) connected first to the sink device detects via the HPD line 130 that it is connected to the HDMI input terminal on the sink device side (HPD: L→H), it dynamically obtains the physical address by reading the EDID. That is to say, from the EDID of the TV1, the DVD player 2 obtains the physical address [1.0.0.0] and the DVD/AV system 3 obtains the physical address [2.0.0.0]. From the EDID of the DVD/AV system 3, the STB 4 obtains the physical address [2.1.0.0] and the DVHS player 6 obtains the physical address [2.2.0.0]. The PVR 5 obtains the physical address [2.1.1.0] from the EDID of the STB 4. At this time, the TV 1 having no HDMI output terminal is defined as a device that serves as a root device having a physical address [0.0.0.0].

Each source device (or repeater device) such as the DVD/AV system 3 stores the obtained physical address in a storage device such as a flash memory. Therefore, each device can hold its physical address even if the device is detached from the HDMI input terminal 8 of the TV 1 and the HPD changes from H to L.

Next, an operation performed when the TV 1 recognizes connection states of the respective connected devices will be described.

As described above, it is difficult for the TV 1 to know the types of the respective device only when the physical addresses are assigned to the respective devices. Therefore, the TV 1 transmits <Polling Message> as the CEC message to the respective devices. This <Polling Message> is a message for a device that supports CEC to know existences and types of other devices by performing Ping (confirmation of reply) on the other devices. By transmitting <Polling Message> to the respective devices regularly (for example, every 15 seconds), the TV 1 can know the types of the respective devices (CEC device types) from the topological point of view in real time. In some cases, a plurality of device types are given to one device. The DVD/AV system 3 has two device types, that is, [Playback device] and [Audio System].

FIG. 6 is a table showing definitions of logical addresses and device types in a CEC protocol.

As shown in this figure, in the CEC protocol, device types are assigned 16 logical addresses from a logical address [0] to a logical address [15], respectively. For example, the logical address [0] is assigned to the TV 1. Since the DVD player 2 corresponds to [Playback Device], any of the logical addresses [4], [8], and [11] is assigned to the DVD player 2. Since the PVR 5 corresponds to [Recording Device], any of the logical addresses [1], [2], and [9] is assigned to the PVR 5. Since the DVD/AV system 3 has two device types of [Playback device] and [Audio System] as described above, any of the logical addresses [4], [8], and [11] and the logical address [5] are assigned thereto. The logical address [15] is an address for broadcast.

The above <Polling Message> is transmitted with any of the logical addresses [0] to [14] as a destination address.

Figure 7:
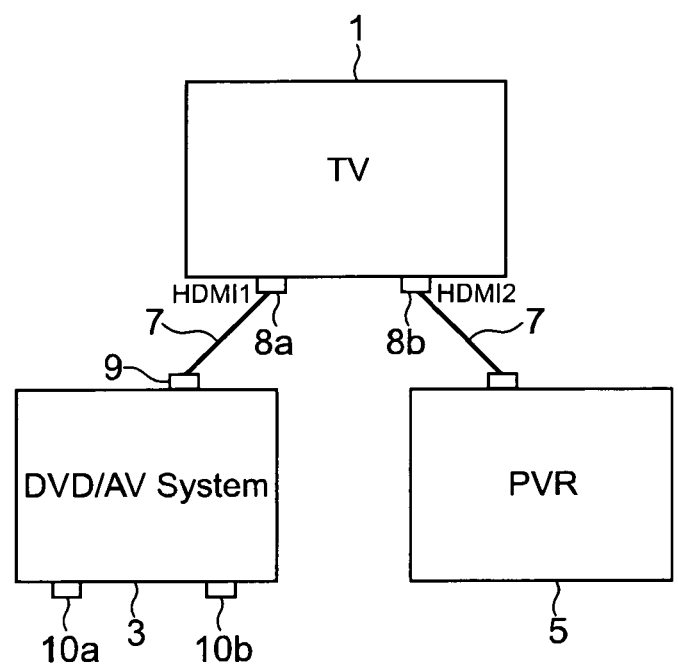
FIG. 7 is a diagram showing another example of the connection between the TV 1 and other devices.

FIG. 7 is a diagram showing another example of the connection between the TV 1 and other devices.

As shown in this figure, the DVD/AV system 3 is connected to the HDMI input terminal 8a (HDMI 1) of the TV 1, and the PVR 5 is connected to the HDMI input terminal 8b (HDMI 2). No device is connected to the HDMI input terminals 10a and 10b of the DVD/AV system 3. A specific example of processing for recognizing connection states performed by the TV 1 will be described below.

Figure 8:
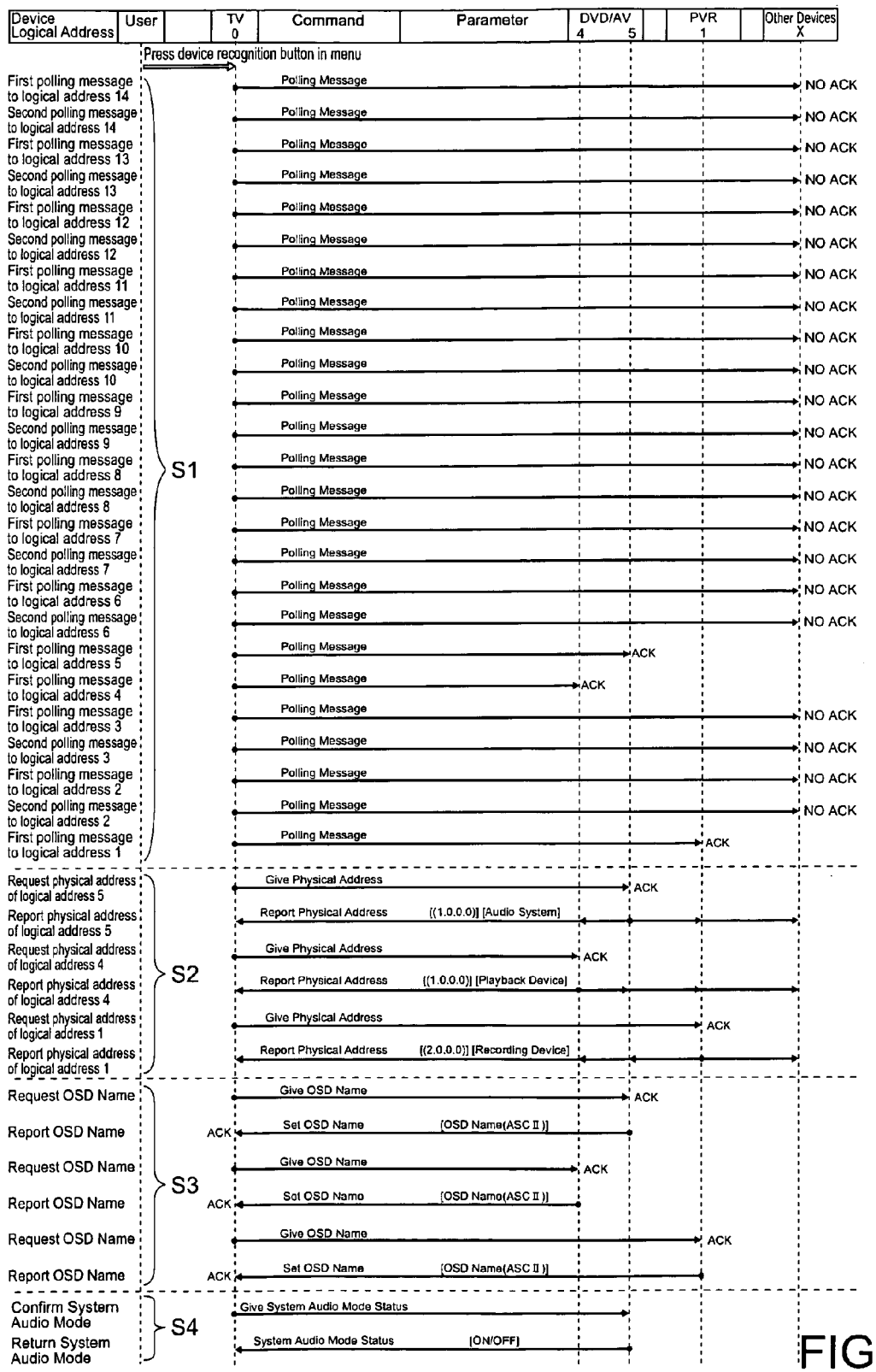
FIG. 8 is a sequence diagram showing a flow of exchange of CEC messages performed when the TV recognizes a connection state of each of the devices in the embodiment of the present invention.

FIG. 8 is a sequence diagram showing a flow of exchange of CEC messages performed when the TV 1 recognizes a connection state of each of devices.

As shown in this figure, first, when a connected device recognition button of the remote controller 11, for example, is pressed by the user while a main menu screen is displayed in the TV 1, the HDMI receiving unit 23 of the TV 1 with the logical address [1] sequentially transmits <Polling Message> to the logical address [14] to the logical address [1]. In this case, ACK is returned for <Polling Message> to each of the logical address [5], logical address [4], and logical address [1], but no ACK is returned for <Polling Message> to each of the other addresses.

The HDMI receiving unit 23 then transmits <Give Physical Address> to the logical address [5], logical address [4], and logical address [1] to request physical addresses of the corresponding respective devices. Each of the devices with the logical address [5], logical address [4], and logical address [1]

returns ACK for that <Give Physical Address>, and reports its own physical address and device type by broadcasting <Report Physical Address>.

In other words, in reply to <Give Physical Address>, the DVD/AV system 3 with the logical address [5] and logical address [4] reports its own physical address [1.0.0.0] and device types [playback Device] and [Audio System] to each of the devices. In reply to <Give Physical Address>, the PVR 5 with the logical address [1] reports its own physical address [2.0.0.0] and device type [Recording Device] to each of the devices. Thus, the TV 1 can know the physical address and device type of each of the devices with the logical address [5], logical address [4], and logical address [1].

If a plurality of devices of the same device type exist and the TV 1 displays the connected device menu screen without changing the obtained device type, it is difficult for the user to distinguish between these devices.

Therefore, the HDMI receiving unit 23 transmits [Give OSD Name] to each of the devices with the logical address [5], logical address [4], and logical address [1] whose physical addresses and device types are obtained. Each of the devices which have received [Give OSD Name] returns ACK to the TV 1 and thereafter transmits [Set OSD Name] thereto (S3). An OSD Name indicates the model name of each device. By receiving this OSD name, the TV 1 can know more detailed information on each of the devices and reflect this information on the connected device menu screen.

Subsequently, the HDMI receiving unit 23 transmits <Give System Audio Mode Status> to the logical address [5] whose device type has been known as [Audio System]. The DVD/AV system 3 with the logical address [5] which has received this <Give System Audio Mode Status> returns <System Audio Mode Status> to the TV 1. Thus, the HDMI receiving unit 23 can switch on and off (mute) between the speaker 21 of the TV 1 and the speaker 40 connected to the DVD/AV system 3.

Incidentally, as described above, the DVD/AV system 3 has two device types, that is, [Playback Device] and [Audio system] and two logical addresses (logical address [5] and logical address [4]) corresponding thereto. On the other hand, the DVD/AV system 3 has one physical address (physical address [1.0.0.0]). If the TV 1 displays both of these two device types on the connected device menu screen, the user is likely to believe that two devices are connected to the HDMI input terminal 8*a* (HDMI 1).

Hence, in this embodiment, confusion for the user can be avoided by prioritizing the device types and displaying only one device type on the connected device menu screen. Processing thereof will be described below.

Figures 9, 10:
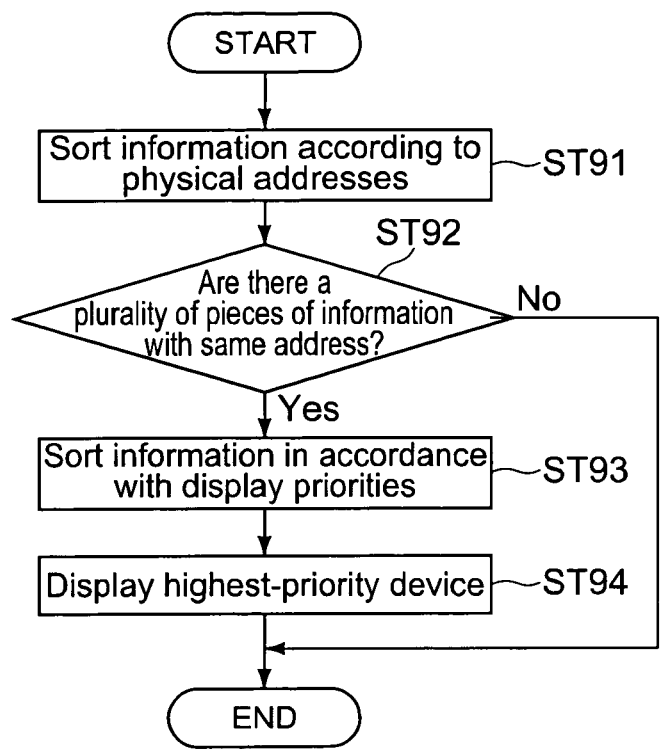
FIG. 9 is a flowchart showing a flow of display processing of a connected device menu screen based on priorities of device types performed by the TV.
FIG. 10 is a diagram showing a display example of the connected device menu screen displayed in the connection example of FIG. 7.

FIG. 9 is a flowchart showing a flow of display processing of the connected device menu screen based on the priorities of the device types performed by the TV 1.

As shown in this figure, the HDMI receiving unit 23 of the TV 1 receives information on the physical addresses and device types corresponding to the logical addresses of respective devices by means of the above <Report Physical Address>, and the CPU 25 sorts the information on the respective devices according to their physical addresses (Step 91). Then, the CPU 25 judges whether a plurality of pieces of information with the same physical address are included in the sorted information (Step 92).

The CPU 25 then sorts the information on the respective devices previously stored in, for example, the flash memory 26 in accordance with display priority information (Step 93). This display priority information is generated, for example, by prioritizing the device types of the respective devices in the following order.

1. Player (Playback Device)
2. Recorder (Recording Device)
3. Tuner
4. Audio System Priorities are of course not limited to the above order. The priorities may be customized by the user.

Then, the CPU 25 selects the highest-priority device type out of the device types with the same physical address and displays the connected device menu screen based on the selected device type (Step 94).

FIG. 10 is a diagram showing a display example of the connected device menu screen displayed in the connection example of FIG. 7.

As shown in this figure, the CPU 25 of the TV 1 displays information on the "device (device type)", "input terminal", and "model" of each connected device on the connected device menu screen 100.

As described above, the TV 1 is notified of the physical address [1.0.0.0] and the device types [Playback Device] and [Audio System] by the DVD/AV system 3 with the logical addresses [4] and [5] and determines ranking according to the above priorities. According to the above priority information, since the priority of the device type [Playback Device] is higher than that of [Audio System], [Playback Device] is selected. Therefore, the CPU 25 of the TV 1 displays [Player 1] as the device name (device type) of a device with the logical addresses [4] and [5] and displays [HDMI 1] (HDMI input terminal 8*a*) as the name of an input terminal to which this device is connected. The CPU 25 also displays the model name of the DVD/AV system 3 based on the reported OSD Name.

Moreover, the TV 1 is notified of the physical address [2.0.0.0], the device type [Recording Device], and the OSD Name of the PVR 5 by the PVR 5 with the logical address [1]. Therefore, the CPU 25 displays [Recorder 1] as the device name (device type) of a device with the logical address [1], displays [HDMI 2] (HDMI input terminal 8*b*) as the input terminal name, and further displays the model name thereof.

Thus, user-friendliness can be obtained by displaying only one device type of each device having a plurality of device types.

Figure 11:
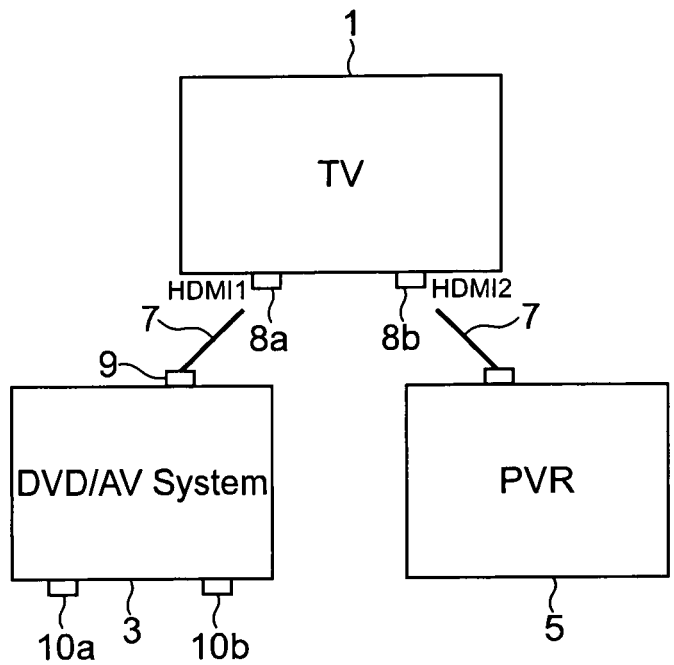
FIG. 11 is a diagram showing a state where all the devices are detached from HDMI input terminals of the TV in the embodiment of the present invention.

FIG. 11 is a diagram showing a state where all the devices are detached from the HDMI input terminals 8*a* and 8*b* of the TV 1. Update processing of the connected device menu screen 100 in this figure will be described below.

Figure 12:
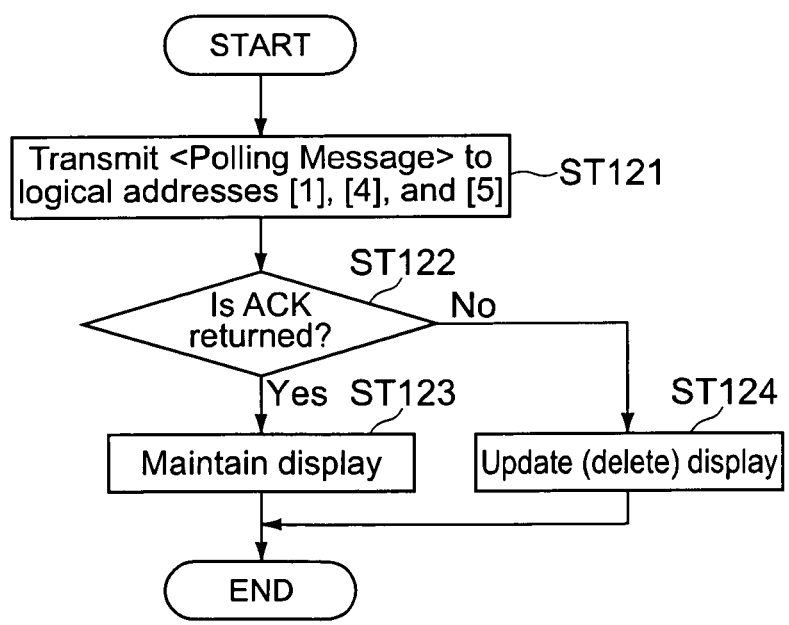
FIG. 12 is a diagram showing a flow of update processing of the connected device menu screen performed when the devices are detached from the TV in the embodiment of the present invention.

FIG. 12 is a diagram showing a flow of the update processing of the connected device menu screen 100 performed when the devices are detached from the TV 1.

As shown in this figure, the HDMI receiving unit 23 transmits the above <Polling Message> to each of the DVD/AV system 3 with the logical addresses [4] and [5] and the PVR 5 with the logical address [1] (Step 121). Then, the CPU 25 judges whether or not ACK is returned for this <Polling Message> (Step 122).

When ACK is returned from each of the devices (Yes), the CPU 25 maintains the display of the connected device menu screen 100 as it is (Step 123). When ACK is not returned from any of the devices (No), the CPU 25 deletes display items of the device from which ACK is not returned and updates the connected device menu screen 100 (Step 124).

Figure 13:
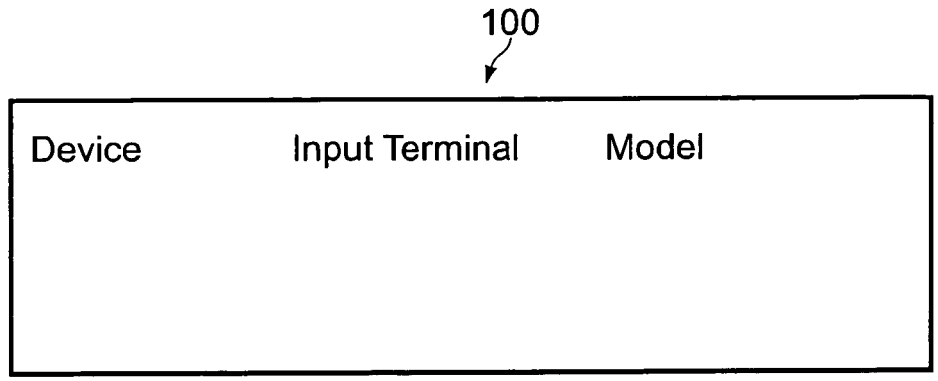
FIG. 13 is a diagram showing a display example of the connected device menu screen displayed when the devices are detached from the TV in the embodiment of the present invention.

FIG. 13 is a diagram showing a display example of the connected device menu screen 100 displayed when the devices are detached from the TV 1. This figure is a display example displayed when both of the DVD/AV system 3 and the PVR 5 are detached from the TV 1. As shown in this figure, all hitherto displayed items are deleted. Accordingly, the user can know in real time that no device is currently connected to the HDMI input terminals 8a and 8b of the TV 1.

Figure 14:
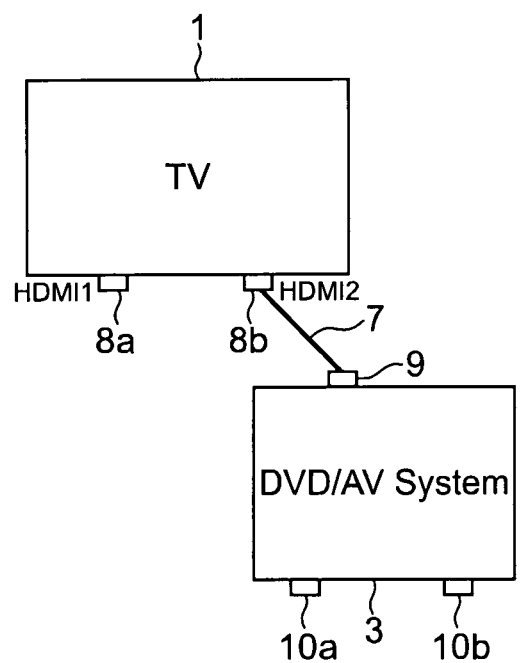
FIG. 14 is a diagram showing a state where a connection destination of the DVD/AV system is changed to the other HDMI input terminal of the TV in the embodiment of the present invention.

FIG. 14 is a diagram showing a state where the connection destination of DVD/AV system 3 is changed to the HDMI input terminal 8b (HDMI 2) of the TV 1 after the connection states shown in FIG. 7 and FIG. 11. An operation of the DVD/AV system 3 in this case will be described below.

Figure 15:
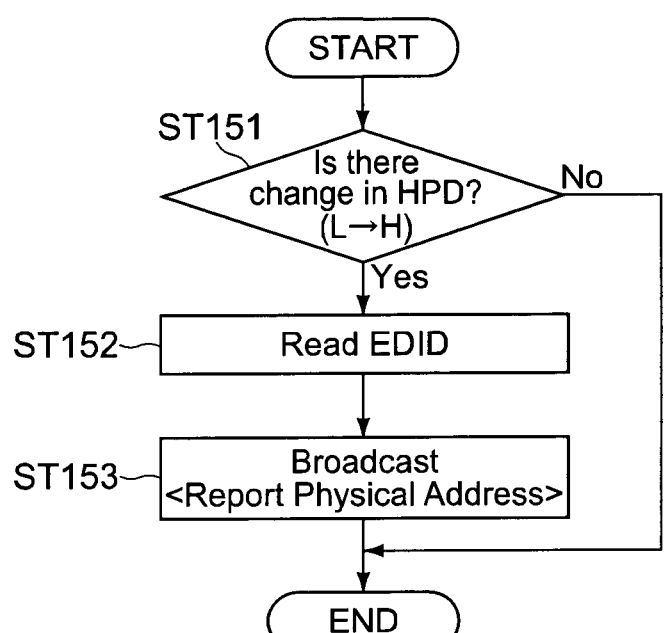
FIG. 15 is a flowchart showing a flow of an operation of the DVD/AV system performed when the connection destination of the DVD/AV system is changed to the other HDMI input terminal of the TV in the embodiment of the present invention.
Figure 16:
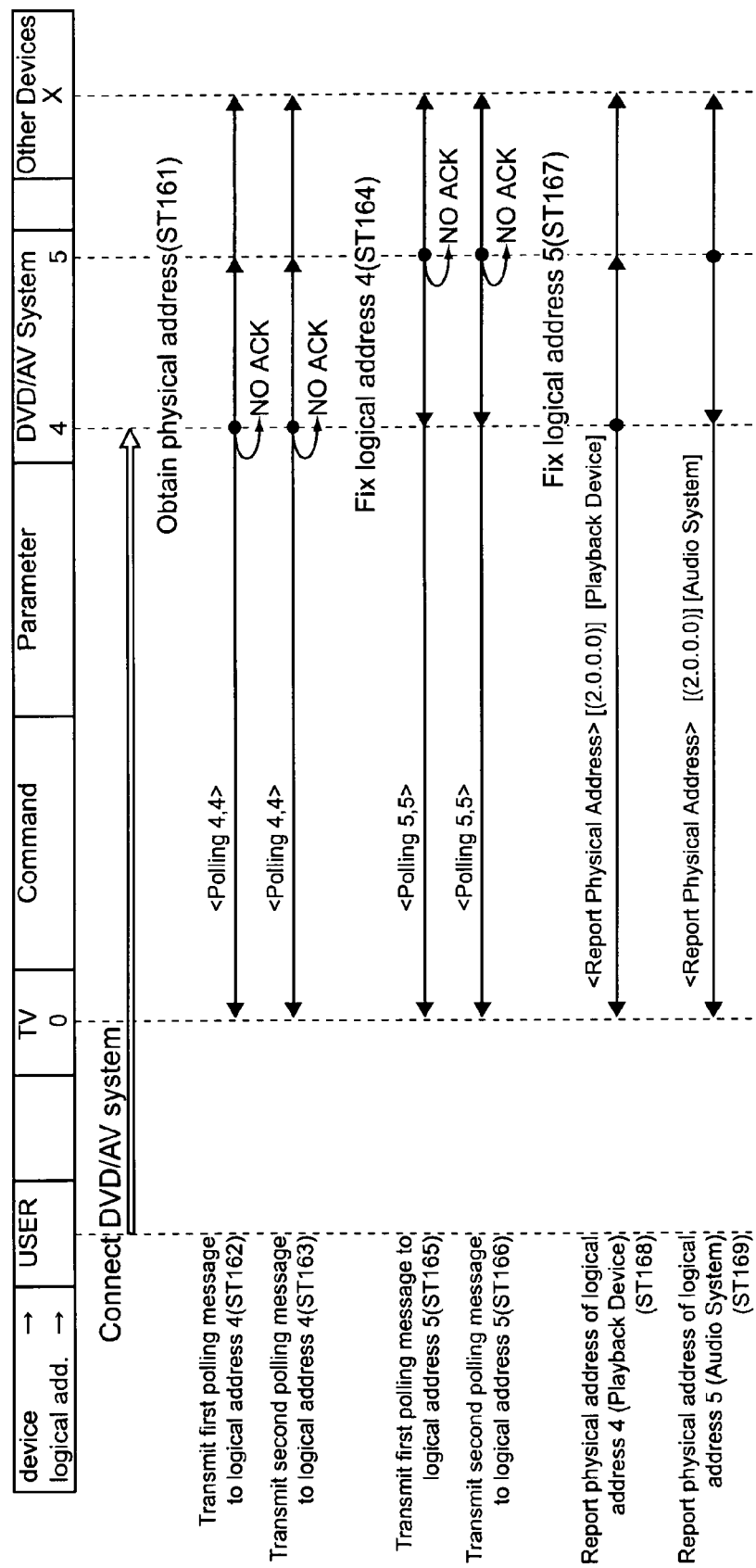
FIG. 16 is a sequence diagram showing exchange of CEC messages between the respective devices when the connection destination of the DVD/AV system is changed to the other HDMI input terminal of the TV in the embodiment of the present invention.

FIG. 15 is a flowchart showing a flow of the operation of the DVD/AV system 3 performed when the connection destination of the DVD/AV system 3 is changed to the HDMI input terminal 8b of the TV 1. FIG. 16 is a sequence diagram showing exchange of CEC messages between the respective devices in this case.

As shown in FIG. 11, in a stage where the DVD/AV system 3 is detached from the TV 1, the DVD/AV system 3 detects the shift of the HPD from "High" to "Low" but keeps having the physical address [1.0.0.0] of the HDMI input terminal 8a (HDMI 1) of the TV 1. When from this state, the connection destination of the DVD/AV system 3 is changed to the HDMI input terminal 8b (HDMI 2) of the TV 1, as shown in FIG. 15, the HDMI transmitting unit 46 of the DVD/AV system 3 detects a change in the state of the HPD (Low→High) (Yes in Step 151 of FIG. 15).

With the detection of the change of the HPD from L to H as a trigger, the HDMI transmitting unit 46 reads again the EDID from the EDIDROM 60 of the TV 1 via the DDC line 110 and obtains the physical address [2.0.0.0] assigned to the HDMI input terminal 8b (HDMI 2) of the TV 1 (Step 152 of FIG. 15, Step 161 of FIG. 16). This physical address is held, for example, in the flash memory 42. That is to say, the physical address [1.0.0.0] stored in the flash memory 42 in the connection state of FIG. 7 is updated to [2.0.0.0] and the updated one is newly held.

Subsequently, the HDMI transmitting unit 46 transmits <Polling Message> to the logical address [4] twice (Step 162 and Step 163 of FIG. 16). When confirming that no ACK is returned for this <Polling Message>, the HDMI transmitting unit 46 fixes its own logical address as [Playback Device] at [4] (Step 164).

Similarly, the HDMI transmitting unit 46 transmits <Polling Message> to the logical address [5] twice (Step 165 and Step 166 of FIG. 16). When confirming that no ACK is returned for this <Polling Message>, the HDMI transmitting unit 46 fixes its own logical address as [Audio System] at [5] (Step 167).

The HDMI transmitting unit 46 then reports the updated physical address [2.0.0.0] and device type [Playback Device] of the logical address [4] and the updated physical address [2.0.0.0] and device type [Audio System] of the logical address [5] by broadcast (Step 153 of FIG. 15, Steps 168 and 169 of FIG. 16). After that, although not shown, the HDMI transmitting unit 46 also reports the OSD Name to the TV 1, for example, upon request of the TV 1 or voluntarily.

By the processing described above, the TV 1 can obtain information on the new physical address, device type, and OSD Name of the DVD/AV system 3 when the connection destination of the DVD/AV system 3 is changed to HDMI input terminal 8b (HDMI 2) of the TV 1. The TV 1 can update the connected device menu screen 100 based on the newly obtained information.

Figure 17:
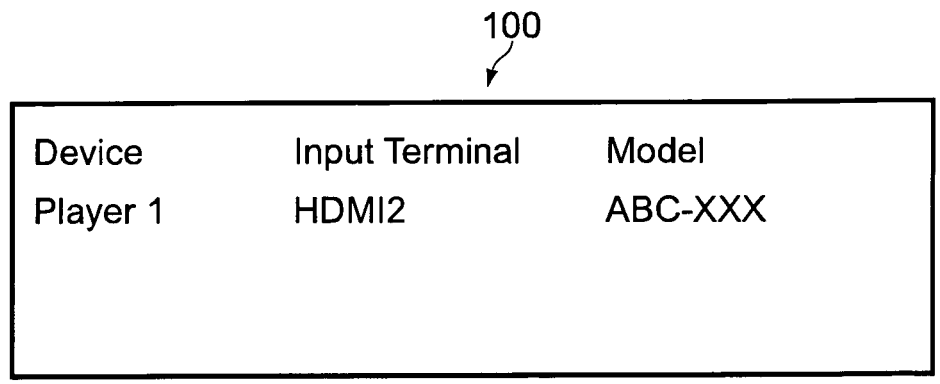
FIG. 17 is a diagram showing a display example of the connected device menu screen displayed when the connection destination of the DVD/AV system is changed to the other HDMI input terminal of the TV in the embodiment of the present invention.

FIG. 17 is a diagram showing a display example of the connected device menu screen 100 displayed when the connection destination of the DVD/AV system 3 is changed to the HDMI input terminal 8b (HDMI 2) of the TV 1.

As shown in this figure, compared to FIG. 10, the input terminal name out of display items of the DVD/AV system 3 (Player 1) is updated to "HDMI 2". Thus, the TV 1 can immediately notify the user that the connection destination of the DVD/AV system 3 has been changed to the HDMI input terminal 8b (HDMI 2), leading to an improvement in user-friendliness.

It is to be understood that the present invention is not intended to be limited to the above embodiment, and various changes may be made therein without departing from the spirit of the present invention.

In the above embodiment, as for a device such as the DVD/AV system 3 having a plurality of device types, the TV 1 displays only one highest-priority device type on the connected device menu screen 100 based on the above priority information. However, the TV 1 may display all the plurality of device types on the connected device menu screen 100.

Figure 18:
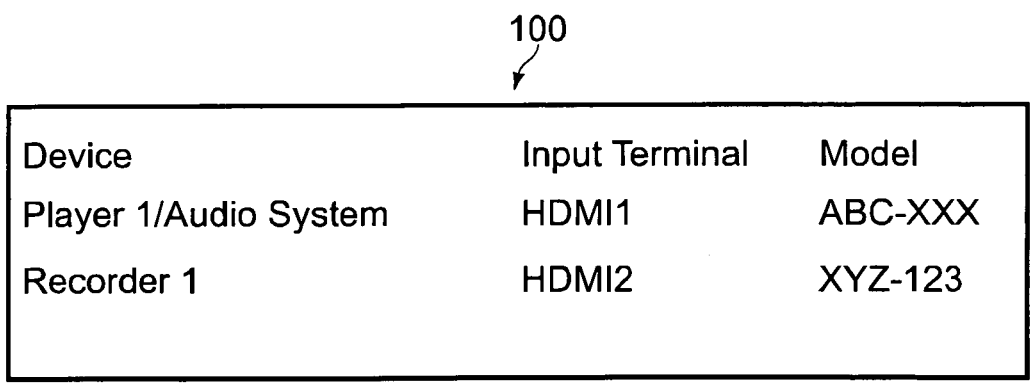
FIG. 18 is a diagram showing a display example of a connected device menu screen in another embodiment of the present invention.

FIG. 18 is a diagram showing a display example of the connected device menu screen 100 in this case. This figure shows the display example in the above connection state of FIG. 7. As shown in this figure, regarding the DVD/AV system 3, two device types, that is, "Player 1" and "Audio System" are displayed while separated, for example, by "/". By displaying all device types as just described, the TV 1 can inform the user of all functions of each of the connected devices.

In the above embodiment, as shown in FIG. 8, each of the devices connected to the TV 1 transmits <Report Physical Address> in response to <Give Physical Address> transmitted from the TV 1. However, in a case of obtaining the physical address, each source device may transmit <Report Physical Address> voluntarily even when it does not receive <Give Physical Address>.

In the above embodiment, the TV 1 displays information on the device name, input terminal name, and model name on the connected device menu screen 100. However, the display items are not limited to the above three items. For example, the TV 1 may display not only information for broadly distinguishing among the device names such as "Player" and "Recorder" but also items showing the types of devices in more detail, for example, a DVD player, an HDD recorder, and the like.

In the above embodiment, the TV is shown as the sink device in the transmission system, and the DVD player, the DVD/AV system, the STB, the PVR, the DVHS player as the source devices (repeater devices) therein. However, the present invention is of course applicable to other electronic devices such as a tuner and a camcorder.

What is claimed is:
1. A device, comprising:
an HDMI (High-Definition Multimedia Interface) output terminal connectable to one of a first HDMI input terminal and a second HDMI input terminal of another device, the first HDMI input terminal having a first physical address assigned thereto, the second HDMI input terminal having a second physical address assigned thereto;
detection means for detecting a connection of the HDMI output terminal to one of the first and second HDMI input terminals;
read means for reading the first physical address from the another device when the connection of the HDMI output terminal to the first HDMI input terminal is detected and for reading the second physical address from the another device when the connection of the HDMI output terminal to the second HDMI input terminal is detected;

transmission means for transmitting the read one of the first and second physical addresses to the another device via the HDMI output terminal;

means for receiving a periodic polling message from the another device and for sending an acknowledgement to the another device in response to receipt of the polling message, in which the polling message conforms to a CEC (consumer electronics control) protocol and is addressed to a logical address associated with the device, and in which the acknowledgement is sent prior to receiving a request from the another device for the transmission means to transmit the read one of the first and second physical addresses to the another device;

storage means for storing, when the detection means detects the connection to the first HDMI input terminal and the read means reads the first physical address from the another device, the first physical address; and update means for updating, when the detection means detects that the HDMI output terminal is no longer connected to the first HDMI input terminal and detects the connection of the HDMI output terminal to the second HDMI input terminal and the read means reads the second physical address from the another device, the stored first physical address to the read second physical address.

2. The device as set forth in claim 1, wherein the transmission means transmits device type information indicating a device type of the device with one of the first and second physical addresses to the another device.

3. The device as set forth in claim 2, wherein the transmission means further transmits model name information indicating a model name of the device.

4. A device, comprising:
a first HDMI (High-Definition Multimedia Interface) input terminal connectable to an HDMI output terminal of another device;
a second HDMI input terminal connectable to the HDMI output terminal;
first storage means for storing a first physical address assigned to the first HDMI input terminal and a second physical address assigned to the second HDMI input terminal;
reception means for receiving the first physical address and device type information indicating a device type of the another device from the another device when the HDMI output terminal is connected to the first HDMI input terminal, and receiving the second physical address and the device type information from the another device when the HDMI output terminal is connected to the second HDMI input terminal; and
display means for displaying input terminal identification information identifying the HDMI input terminal to which the another device is connected and the device type information on the another device based on at least one of the received first and second physical addresses and the received device type information; and
means for transmitting a periodic polling message to the another device and for receiving an acknowledgement from the another device in response to receipt of the polling message, in which the polling message conforms to a CEC (consumer electronics control) protocol and is addressed to a logical address associated with the another device, and in which the acknowledgement is received prior to the device sending a request to the another device for receipt by the reception means of the first physical address and device type information when the HDMI output terminal is connected to the first HDMI input terminal or the second physical address and the device type information when the HDMI output terminal is connected to the second HDMI input terminal, wherein when the first HDMI input terminal is connected to the first HDMI output terminal of the another device, the device sends a request to the another device for receipt by the reception means of the first physical address and device type information and the reception means receives the first physical address and device type information from the another device, and when the first HDMI input terminal is then disconnected from the first HDMI output terminal of the another device and is thereafter connected to the second HDMI output terminal of the another device, the device sends a request to the another device for receipt by the reception means of the second physical address and device type information and the reception means receives an updated physical address and device type information from the another device.

5. The device as set forth in claim 4, wherein the display means updates and displays, based on the received second physical address when the HDMI output terminal is connected to the second HDMI input terminal, the input terminal identification information that has been displayed based on the received first physical address in a case where the HDMI output terminal has been connected to the first HDMI input terminal.

6. The device as set forth in claim 5, further comprising:
second storage means for storing priority information indicating priorities of a plurality of different pieces of the device type information,
wherein a plurality of different device types are assigned to the another device, wherein the reception means receives the plurality of pieces of device type information respectively, and wherein the display means displays for each another device one piece of device type information selected from among the received plurality of pieces of device type information based on the stored priority information.

7. The device as set forth in claim 6, wherein the reception means further receives model name information indicating a model name of the another device, and wherein the display means displays the received model name information with the device type information and the input terminal identification information.

8. The device as set forth in claim 5, wherein a plurality of different device types are assigned to the another device, wherein the reception means receives the plurality of pieces of device type information respectively, and wherein the display means displays the received plurality of pieces of device type information with the input terminal identification information.

9. A display system, comprising:
a first device having an HDMI (High-Definition Multimedia Interface) output terminal; and
a second device having a first HDMI input terminal and a second HDMI input terminal;
the first device including:
first storage means for storing device type information indicating a device type of the first device,
detection means for detecting a connection of the HDMI output terminal to one of the first and second HDMI input terminals,
read means for reading a first physical address assigned to the first HDMI input terminal from the second device when the connection of the HDMI output terminal to the first HDMI input terminal is detected and reading a second physical address assigned to the second HDMI input terminal from the second device when the connection of the HDMI output terminal to the second HDMI input terminal is detected, transmission means for transmitting the read one of the first and second physical addresses and the device type information to the second device via the HDMI output terminal, storage means for storing, when the detection means detects the connection to the first HDMI input terminal and the read means reads the first physical address from the second device, the first physical address, and update means for updating, when the detection means detects that the HDMI output terminal is no longer connected to the first HDMI input terminal and detects the connection of the HDMI output terminal to the second HDMI input terminal and the read means reads the second physical address from the second device, the stored first physical address to the read second physical address;

the second device including:

second storage means for storing the first and second physical addresses, reception means for receiving the transmitted first physical address and device type information via the first HDMI input terminal and receiving the transmitted second physical address and device type information via the second HDMI input terminal, and display means for displaying input terminal identification information identifying the HDMI input terminal to which the first device is connected and the device type information on the first device based on at least one of the received first and second physical addresses and the device type information, the first device having means for receiving a periodic polling message from the second device and for sending an acknowledgement to the second device in response to receipt of the polling message, in which the polling message conforms to a CEC (consumer electronics control) protocol and is addressed to a logical address associated with the first device, and in which the acknowledgement is sent prior to the first device receiving a request from the second device for the transmission means to transmit the read one of the first and second physical addresses and the device type information to the second device, wherein when the first HDMI input terminal is connected to the first HDMI output terminal of the second device, the first device sends a request to the second device for receipt by the reception means of the first physical address and device type information and the reception means receives the first physical address and device type information from the second device, and when the first HDMI input terminal is then disconnected from the first HDMI output terminal of the another device and is thereafter connected to the second HDMI output terminal of the another device, the first device sends a request to the second device for receipt by the reception means of the second physical address and device type information and the reception means receives the updated physical address and device type information from the second device.

10. In a first device, a transmission method, comprising:
detecting that an HDMI (High-Definition Multimedia Interface) output terminal of the first device is connected to one of a first HDMI input terminal and a second HDMI input terminal of a second device, the first HDMI input terminal having a first physical address assigned thereto, the second HDMI input terminal having a second physical address assigned thereto;

reading the first physical address from the second device when the connection of the HDMI output terminal to the first HDMI input terminal is detected and reading the second physical address from the second device when the connection of the HDMI output terminal to the second HDMI input terminal is detected;

transmitting the read one of the first and second physical addresses to the second device via the HDMI output terminal;

receiving a periodic polling message from the second device and sending an acknowledgement to the second device in response to receipt of the polling message, in which the polling message conforms to a CEC (consumer electronics control) protocol and is addressed to a logical address associated with the first device, and in which the acknowledgement is sent prior to the first device receiving a request from the second device to transmit the read one of the first and second physical addresses to the second device;

when the connection to the first HDMI input terminal is detected and the first physical address is read from the second device,
storing the first physical address, and
when disconnection of the HDMI output terminal from the first HDMI input terminal and the connection of the HDMI output terminal to the second HDMI input terminal are detected, and the second physical address is read from the second device,
updating the stored first physical address to the read second physical address.

11. A display method, comprising:
storing a first physical address assigned to a first HDMI (High-Definition Multimedia Interface) input terminal of aft first device connectable to an HDMI output terminal of second device and a second physical address assigned to a second HDMI input terminal of the first device connectable to the HDMI output terminal;

receiving the first physical address and device type information indicating a device type of the second device from the second device when the HDMI output terminal is connected to the first HDMI input terminal, and receiving the second physical address and the device type information from the another device when the HDMI output terminal is connected to the second HDMI input terminal;

displaying input terminal identification information identifying the HDMI input terminal to which the second device is connected and the device type information on the second device based on at least one of the received first and second physical addresses and the received device type information; and transmitting a periodic polling message to the second device and receiving an acknowledgement from the second device in response to receipt of the polling message, in which the polling message conforms to a CEC (consumer electronics control) protocol and is addressed to a logical address associated with the second device, and in which the acknowledgement is received prior to sending a request to the second device for receipt of the first physical address and device type information when the HDMI output terminal is connected to the first HDMI input terminal or the second physical address and the device type information when the HDMI output terminal is connected to the second HDMI input terminal,
wherein when the first HDMI input terminal is connected to the first HDMI output terminal of the another device, the first device sends a request to the second device for receipt of the first physical address and device type information, and the first physical address and device type information are received from the second device, and
when the first HDMI input terminal is then disconnected from the first HDMI output terminal of the another device and is thereafter connected to the second HDMI output terminal of the another device, the first device sends a request to the second device for receipt of the second physical address and device type information, and an updated physical address and device type information are received from the second device.

12. A device, comprising:
an HDMI (High-Definition Multimedia Interface) output terminal connectable to one of a first HDMI input terminal and a second HDMI input terminal of another device, the first HDMI input terminal having a first physical address assigned thereto, the second HDMI input terminal having a second physical address assigned thereto;
a detection unit that detects a connection of the HDMI output terminal to one of the first and second HDMI input terminals;
a read unit that reads the first physical address from the another device when the connection of the HDMI output terminal to the first HDMI input terminal is detected and that reads the second physical address from the another device when the connection of the HDMI output terminal to the second HDMI input terminal is detected;
a transmission unit that transmits the read one of the first and second physical addresses to the another device via the HDMI output terminal;
a receiving unit that receives a periodic polling message from the another device and sends an acknowledgement to the another device in response to receipt of the polling message, in which the polling message conforms to a CEC (consumer electronics control) protocol and is addressed to a logical address associated with the device, and in which the acknowledgement is sent prior to the receiving unit receiving a request for the transmission unit to transmit the read one of the first and second physical addresses to the another device;
a storage unit that stores, when the detection unit detects the connection to the first HDMI input terminal and the read unit reads the first physical address from the another device, the first physical address; and
an update unit that updates, when the detection unit detects that the HDMI output terminal is no longer connected to the first HDMI input terminal and detects the connection of the HDMI output terminal to the second HDMI input terminal and the read unit reads the second physical address from the another device, the stored first physical address to the read second physical address.

13. The device as set forth in claim 11, wherein the transmission unit transmits device type information indicating a device type of the device with one of the first and second physical addresses to the another device.

14. The device as set forth in claim 13, wherein the transmission unit further transmits model name information indicating a model name of the device.

15. A device, comprising:
a first HDMI (High-Definition Multimedia Interface) input terminal connectable to an HDMI output terminal of another device;
a second HDMI input terminal connectable to the HDMI output terminal;
a first storage unit that stores a first physical address assigned to the first HDMI input terminal and a second physical address assigned to the second HDMI input terminal;
a reception unit that receives the first physical address and device type information indicating a device type of the another device from the another device when the HDMI output terminal is connected to the first HDMI input terminal, and that receives the second physical address and the device type information from the another device when the HDMI output terminal is connected to the second HDMI input terminal; and
a display unit that displays input terminal identification information identifying the HDMI input terminal to which the another device is connected and the device type information on the another device based on at least one of the received first and second physical addresses and the received device type information; and
a transmitting unit that transmits a periodic polling message to the another device and receives an acknowledgement from the another device in response to receipt of the polling message, in which the polling message conforms to a CEC (consumer electronics control) protocol and is addressed to a logical address associated with the another device, and in which the acknowledgement is sent prior to the device sending a request for receipt by the reception unit of the first physical address and device type information when the HDMI output terminal is connected to the first HDMI input terminal or the second physical address and the device type information when the HDMI output terminal is connected to the second HDMI input terminal,
wherein when the first HDMI input terminal is connected to the first HDMI output terminal of the another device, the device sends a request to the another device for receipt by the reception unit of the first physical address and device type information and the reception unit receives the first physical address and device type information from the another device, and
when the first HDMI input terminal is then disconnected from the first HDMI output terminal of the another device and is thereafter connected to the second HDMI output terminal of the another device, the device sends a request to the another device for receipt by the reception unit of the second physical address and device type information and the reception unit receives an updated physical address and device type information from the another device.

16. The device as set forth in claim 15, wherein the display unit updates and displays, based on the received second physical address when the HDMI output terminal is connected to the second HDMI input terminal, the input terminal identification information that has been displayed based on the received first physical address in a case where the HDMI output terminal has been connected to the first HDMI input terminal.

17. The device as set forth in claim 16, further comprising:
a second storage unit that stores priority information indicating priorities of a plurality of different pieces of the device type information, wherein a plurality of different device types are assigned to the another device, wherein the reception unit receives the plurality of pieces of device type information respectively, and wherein the display unit displays for each another device one piece of device type information selected from among the received plurality of pieces of device type information based on the stored priority information.

18. The device as set forth in claim 17, wherein the reception unit further receives model name information indicating a model name of the another device, and wherein the display unit displays the received model name information with the device type information and the input terminal identification information.

19. The device as set forth in claim 16, wherein a plurality of different device types are assigned to the another device, wherein the reception unit receives the plurality of pieces of device type information respectively, and wherein the display unit displays the received plurality of pieces of device type information with the input terminal identification information.

20. A display system, comprising:
a first device having an HDMI (High-Definition Multimedia Interface) output terminal; and
a second device having a first HDMI input terminal and a second HDMI input terminal;
the first device including:
a first storage unit that stores device type information indicating a device type of the first device,
a detection unit that detects a connection of the HDMI output terminal to one of the first and second HDMI input terminals,
a read unit that reads a first physical address assigned to the first HDMI input terminal from the second device when the connection of the HDMI output terminal to the first HDMI input terminal is detected and that reads a second physical address assigned to the second HDMI input terminal from the second device when the connection of the HDMI output terminal to the second HDMI input terminal is detected,
a transmission unit that transmits the read one of the first and second physical addresses and the device type information to the second device via the HDMI output terminal,
a storage unit that stores, when the detection unit detects the connection to the first HDMI input terminal and the read unit reads the first physical address from the second device, the first physical address; and
an update unit that updates, when the detection unit detects that the HDMI output terminal is no longer connected to the first HDMI input terminal and detects the connection of the HDMI output terminal to the second HDMI input terminal and the read unit reads the second physical address from the second device, the stored first physical address to the read second physical address the second device including:

a second storage unit that stores the first and second physical addresses, a reception unit that receives the transmitted first physical address and device type information via the first HDMI input terminal and receives the transmitted second physical address and device type information via the second HDMI input terminal, and a display unit that displays input terminal identification information identifying the HDMI input terminal to which the first device is connected and the device type information on the first device based on at least one of the received first and second physical addresses and the device type information, the first device having a receiving unit that receives a periodic polling message from the second device and sends an acknowledgement to the second device in response to receipt of the polling message, in which the polling message conforms to a CEC (consumer electronics control) protocol and is addressed to a logical address associated with the first device, and in which the acknowledgement is sent prior to receiving a request from the second device for the transmission unit to transmit the read one of the first and second physical addresses and the device type information to the second device, wherein when the first HDMI input terminal is connected to the first HDMI output terminal of the another device, the device sends a request to the another device for receipt by the reception unit of the first physical address and device type information and the reception unit receives the first physical address and device type information from the another device, and when the first HDMI input terminal is then disconnected from the first HDMI output terminal of the another device and is thereafter connected to the second HDMI output terminal of the another device, the device sends a request to the another device for receipt by the reception unit of the second physical address and device type information and the reception unit receives an updated physical address and device type information from the another device.

* * * * *